United States Patent [19]
Iturralde

[11] Patent Number: 6,128,665
[45] Date of Patent: Oct. 3, 2000

[54] SYSTEM FOR BROADCASTING MESSAGES TO EACH OF DEFAULT VLAN PORTS IN SUBSET OF PORTS DEFINED AS VLAN PORTS

[75] Inventor: Carol E. Iturralde, Framingham, Mass.

[73] Assignee: Cabletron Systems, Inc., Rochester, N.H.

[21] Appl. No.: 08/774,541

[22] Filed: Dec. 30, 1996

[51] Int. Cl.$^7$ ....................................... G06F 13/00
[52] U.S. Cl. .................... 709/238; 709/242; 709/244
[58] Field of Search ................... 370/401, 402; 395/500, 200.68, 200.72, 200.74

[56] References Cited

U.S. PATENT DOCUMENTS

| | | |
|---|---|---|
| 4,823,338 | 4/1989 | Chan et al. . |
| 5,394,402 | 2/1995 | Ross .................................... 370/402 |
| 5,613,069 | 3/1997 | Walker ............................. 395/200.68 |
| 5,684,800 | 11/1997 | Dobbins et al. ....................... 370/401 |
| 5,734,865 | 3/1998 | Yu ........................................ 395/500 |
| 5,740,171 | 4/1998 | Mazzola et al. ....................... 370/401 |
| 5,742,604 | 4/1998 | Edsall et al. ........................... 370/401 |
| 5,752,003 | 5/1998 | Hart ..................................... 395/500 |

OTHER PUBLICATIONS

Saunders, S., "Building Virtual LANS on a Real–World Budget Lanart's Segway Works with Ethernet Switches to Deliver Virtual LANS Powers at a Low Cost", Data Communications, vol. 24, No. 13, Sep. 21, 1995, pp. 39/40 XP000526194.

"Virtual LANS Get Real Ethernet Switch Makers are Taking the Lead in Deploying Virtual LANS Across Campus Networks," Data Communications, vol. 24, No. 3, Mar. 1, 1995.

Anderson, J. K., "Virtual LANS Take Network to Next Level", Computer Technology Review, vol. 16, No. 9, Sep. 1996, pP. 12, 14 XP00042987.

Morency et al., "VLANS: Can LaYer 3 Save the Day", Business Communications Review, vol. 26, No. 12, Dec. 1996, pp. 47–50 XP0020642987.

McGibbon, "Virtual LANS Come of Age" Telecommunications (International Edition), vol. 30, No. 6, Jun. 1996, pp. 48–52, XP002062191.

Networking Solutions Center, The Virtual LAN Technology Report, David Passmore and John Freeman. Dec. 9, 1996.

Strategic Directions, 3Com Transcend VLANS (Leveraging Virtual LAN Technology to Make Networking Easier), VLAN Strategic Directions Paper. Dec. 9, 1996.

Virtual LAN Communications (Statement of Direction: Cisco VLAN Roadmap, White Paper: Cisco IOS VLAN Services, Technology Brief: VLAN Interoperability). Dec. 9, 1996.

Cisco VLAN Roadmap (White Paper: Cisco IOS VLAN Services, White Paper: Virtual LAN Communications, Technology Brief: VLAN Interoperability). Dec. 9, 1996.

VLANs and Routers (Mixing routers, switches and VLANS) Dec. 9, 1996.

White Paper, Switching Paradigms (Everything Has Changed Except the Network) Dec. 9, 1996.

Fundamentals of Switching, Preface, Table of Contents, Chapters 1–5 (12 pages) Dec. 9, 1996.

Cisco Catalyst 5000 Modular Multilayer–Capable Switching System, Product Announcements.

Anderson, J.K. ("Virtual LANs Take To Next Level", Computer technology Review, vol. 16, No. 9, Sep. 1996, pp. 12–14.

*Primary Examiner*—Krisna Lim
*Assistant Examiner*—Philip B. Tran
*Attorney, Agent, or Firm*—Wolf, Greenfield & Sacks, P.C.

[57] ABSTRACT

A data transmission network having a port-based default VLAN that limits flooding to other VLANs. The default VLAN receives a data packet, ascertains the destination address of the packet, and then determines if the destination port is one of the default VLAN ports. The data packet is transmitted to the destination port if it is one of the default VLAN ports, or to each of the default VLAN ports if the destination port is not one of the default VLAN ports. The data packet is not transmitted to any other non-default VLAN port.

8 Claims, 4 Drawing Sheets

SYSTEM FOR BROADCASTING MESSAGES TO EACH OF DEFAULT VLAN PORTS IN SUBSET OF PORTS DEFINED AS VLAN PORTS

FIELD OF THE INVENTION

This invention generally relates to data transmission networks and, more particularly, to virtual local area networks.

BACKGROUND OF THE INVENTION

A data network typically includes several nodes connected together by a data transport medium. One common method of transmitting data between the nodes is to break the data up into discrete "packets" of data. Packets can be transported over the medium by any one of a variety of transport techniques. In applications utilizing packetized data, data to be transported first is broken up into discrete packets of data, then transmitted through the network medium, and finally reassembled at a destination node. In accordance with current packet protocol, each packet generally comprises a header and an information field. The header contains the information used to transport the cell from one node to the next while the packet data is contained in the information field. Among other information in the header is the destination address of the data packet.

A local area network (i.e., "LAN") is a type of local data network commonly used in a single office or building. LANs are an efficient mechanism for maximizing use of network resources by members of the LAN. Simple LANs typically include two or more nodes (e.g., a server, computer, printer, or other resource) that are interconnected by a common physical connection such as, for example, a hub. Data switches also may be connected to the hub for directing data traffic and for connecting the LAN to other data networks.

LANs can be inconvenient and expensive to maintain. For example, moving a user to another location within a relatively large office building often requires that the LAN be rewired and reconfigured. This can be cumbersome and expensive. The art has responded to this problem by developing virtual local area networks (i.e. "VLANs").

A VLAN is generally defined as a group of nodes interconnected by software to form a single logical broadcast domain. VLANs may be connected to nodes that are members of any number of physical LAN segments. Among many advantages, VLANs enable network administrators to create logical groupings of users and network resources, thereby allowing remote users and resources to appear as if they are members of a single LAN. This enables companies and other organizations to build dynamic, flexible, and distributed LANs, thus simplifying physical moves of a user in a network.

VLANs may be formed by defining logical groups of users within the VLAN. One such VLAN, known as a "port-based" VLAN, defines the VLAN as a collection of switch ports on one or more switches across a hub. Users connected to those defined switch ports therefore are members of the defined VLAN. Broadcast messages directed to that VLAN may be transmitted through the defined switch ports only. Known port-based VLANs typically are implemented on a switch to include a default VLAN, in addition to other VLANs that may be formed on the switch. During manufacture, the default VLAN is defined as every port on a single switch. The number of switch ports defining the default VLAN decreases, however, as ports on the switch are used for defining other VLANs. Accordingly, on an exemplary eight-port switch having a first VLAN defined by ports one and two, the default VLAN will be defined by remaining ports three through eight.

Known port-based default VLANs have data leakage problems that can compromise the security of data transmitted across a network. Specifically, port-based default VLANs transmit a data packet to every switch port when that packet is received by the default VLAN and is destined for a port that is not in the default VLAN. Continuing with the above example, a data packet received on a port defining the default VLAN (i.e., one of ports three through eight) and destined for another port also on the default VLAN will be transmitted to the destination port only. In the event that the data packet was destined for a port on the first VLAN (i.e., port one or two), however, the packet would be transmitted to all of the ports on the switch, thus creating the above mentioned security problem.

Accordingly, it would be desirable to provide a port-based default VLAN that prevents such leakage problems between VLANs. It is among the general objects of this invention to provide such a device and method.

SUMMARY OF THE INVENTION

In accordance with the principles of the invention, a port-based default VLAN is provided that prevents leakage problems across VLANs. To that end, the default VLAN includes means for transmitting data received by the default VLAN to ports defining the default VLAN only. No other ports on the switch will receive a data packet that was received on a port defining the default VLAN.

In accordance with another aspect of the invention, each of the ports on a plurality of switches connected to a hub are configured, during manufacture, to define a default VLAN spanning the plurality of switches. To that end, the default VLAN includes a bus in the hub, an enable switch for electrically connecting each of switches to the bus, and means for defining each of the switch ports as the default VLAN.

It is among the objects of the invention to provide port-based default VLAN and method that prevents leakage across the ports of a switch.

It is another object of the invention to provide a port-based default VLAN that, is configured, during manufacture, to span a plurality of switches connected to a hub.

BRIEF DESCRIPTION OF THE DRAWINGS

The above and further advantages of the invention may be better understood by referring to the following description in conjunction with the accompanying drawings and which.

DETAILED DESCRIPTION OF A PREFERRED EMBODIMENT

Figure 1:
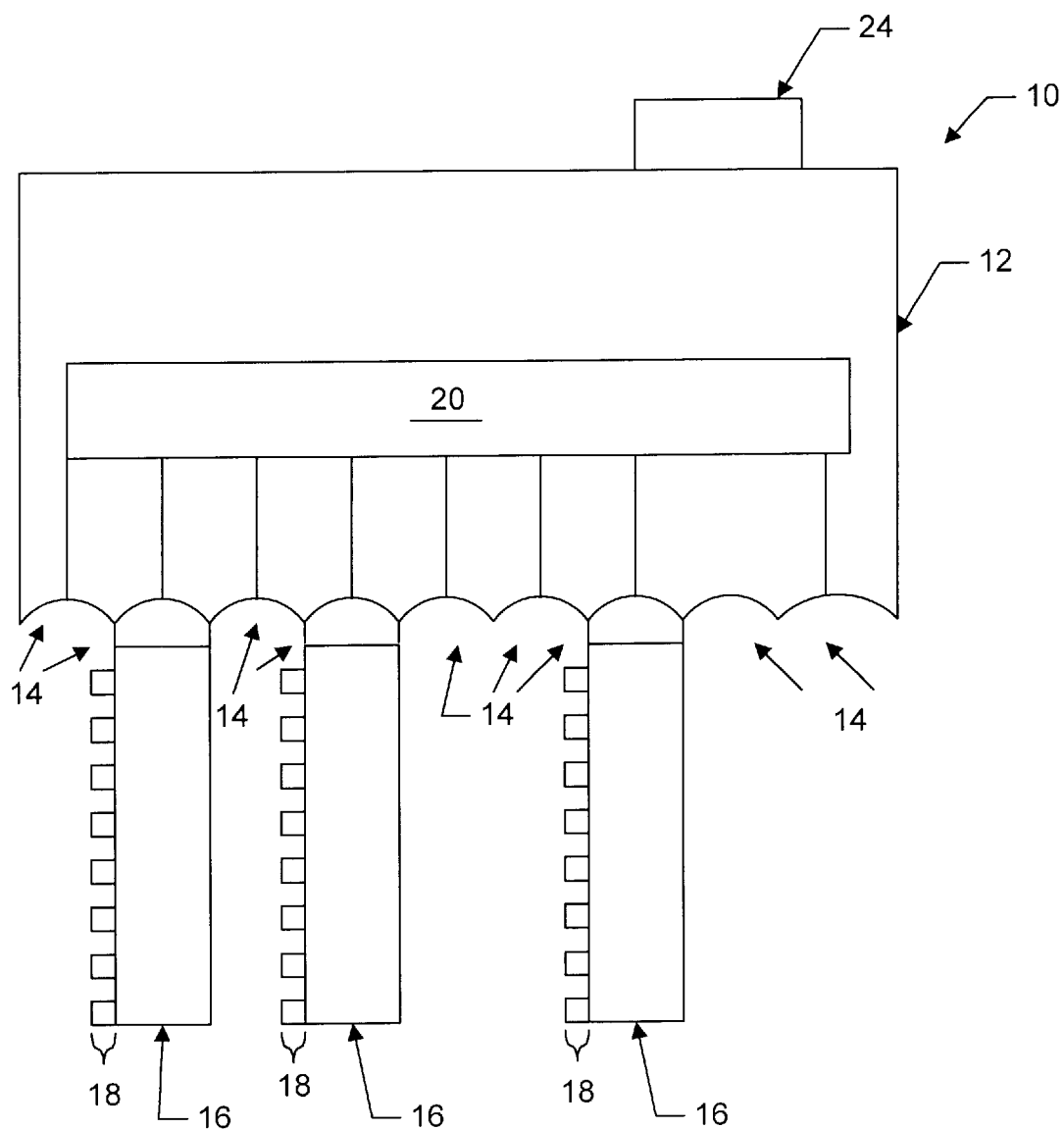
FIG. 1 is a block schematic diagram of a partial data network assembly for implementation of the invention.

FIG. 1 shows a partial data network assembly 10 for implementation of the invention, comprising a hub 12 having hub ports 14, and switches 16 connected to the hub ports 14. The hub 12 may be a DEChub Multiswitch 900, available from Digital Equipment Corporation of Maynard, Mass. Each of the switches 16 has a plurality of switch ports 18 (e.g., eight) connecting various network resources, such as servers, computers, and printers, to the network. A bus 20 spanning each of the hub ports 14 may be enabled by an enable switch 24 to interconnect each of the switches 16. This consequently interconnects each of the switch ports 18 across each of the interconnected switches 16. In the preferred embodiment, the bus 20 is enabled during manufacture, thus defining the default VLAN as all of the ports of the interconnected switches 16. The enable switch 24 may be implemented as firmware within the hub 12, or as a manually actuated switch on the hub 12.

New port-based VLANs may be formed across one or more of the switches 16 by selecting combinations of interconnected switch ports 18. Selected switch ports 18 for new VLANs consequently are removed from the default VLAN definition, thus reducing the size of the default VLAN. No data packets received on any one of the default VLAN ports may be transmitted to the ports that define other VLANs.

Figure 2:
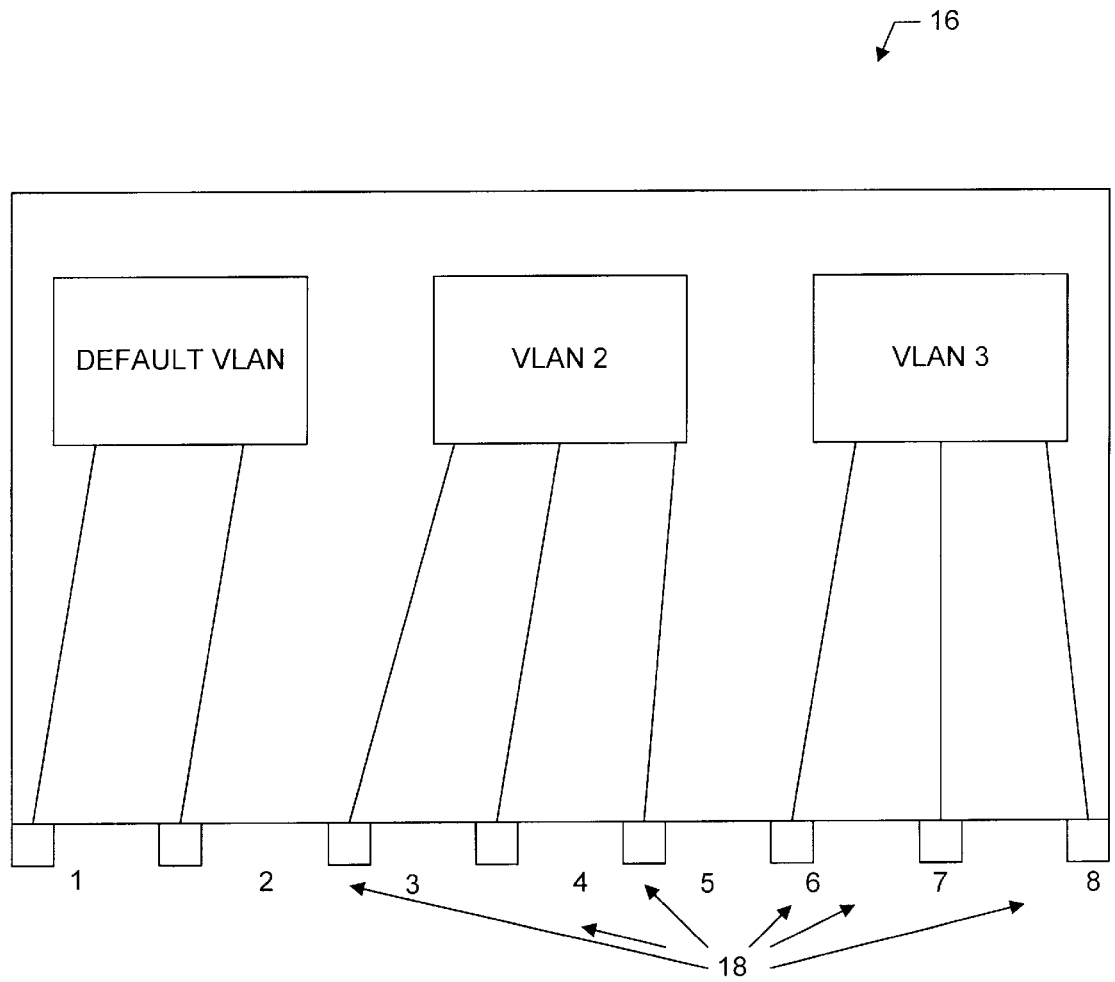
FIG. 2 is a block schematic diagram of a switch that forms a port-based, default VLAN.

FIG. 2 shows an exemplary eight port switch 16 forming a default VLAN, VLAN 2, and VLAN 3. Ports one and two define the default VLAN, ports three to five define VLAN 2, and ports six to eight define VLAN 3. Data packets received on switch ports one or two may be transmitted to either or both of those switch ports 18 only, thus preventing leakage to VLAN 2 and VLAN 3. For example, a data packet received on port two having a destination address of port four will be transmitted to both ports one and two only. Similarly, a data packet received on port two having a destination address of port one will be transmitted to port one only. VLAN 2 and VLAN 3 limit leakage in like fashion.

Figure 3:
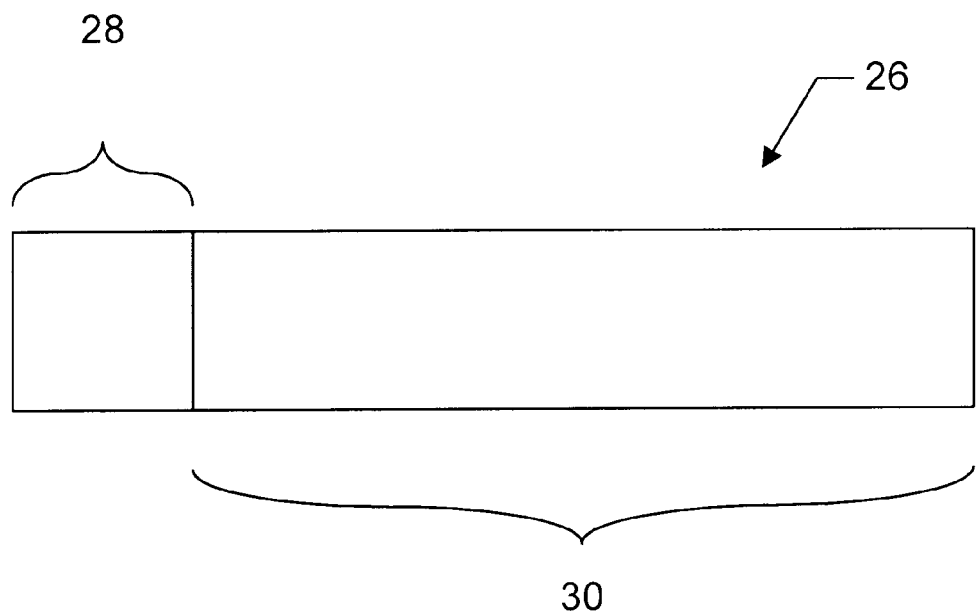
FIG. 3 is a schematic diagram of a data packet.

FIG. 3 shows a data packet 26, comprising a header 28 and an information field 30. The destination address of the data packet 26 is stored in the header 28 of the data packet 26. The switch port 18 associated with the destination address is ascertained by conventional means within the switch 16 receiving the data packet 26. This information is used by the method shown in FIG. 4.

Figure 4:
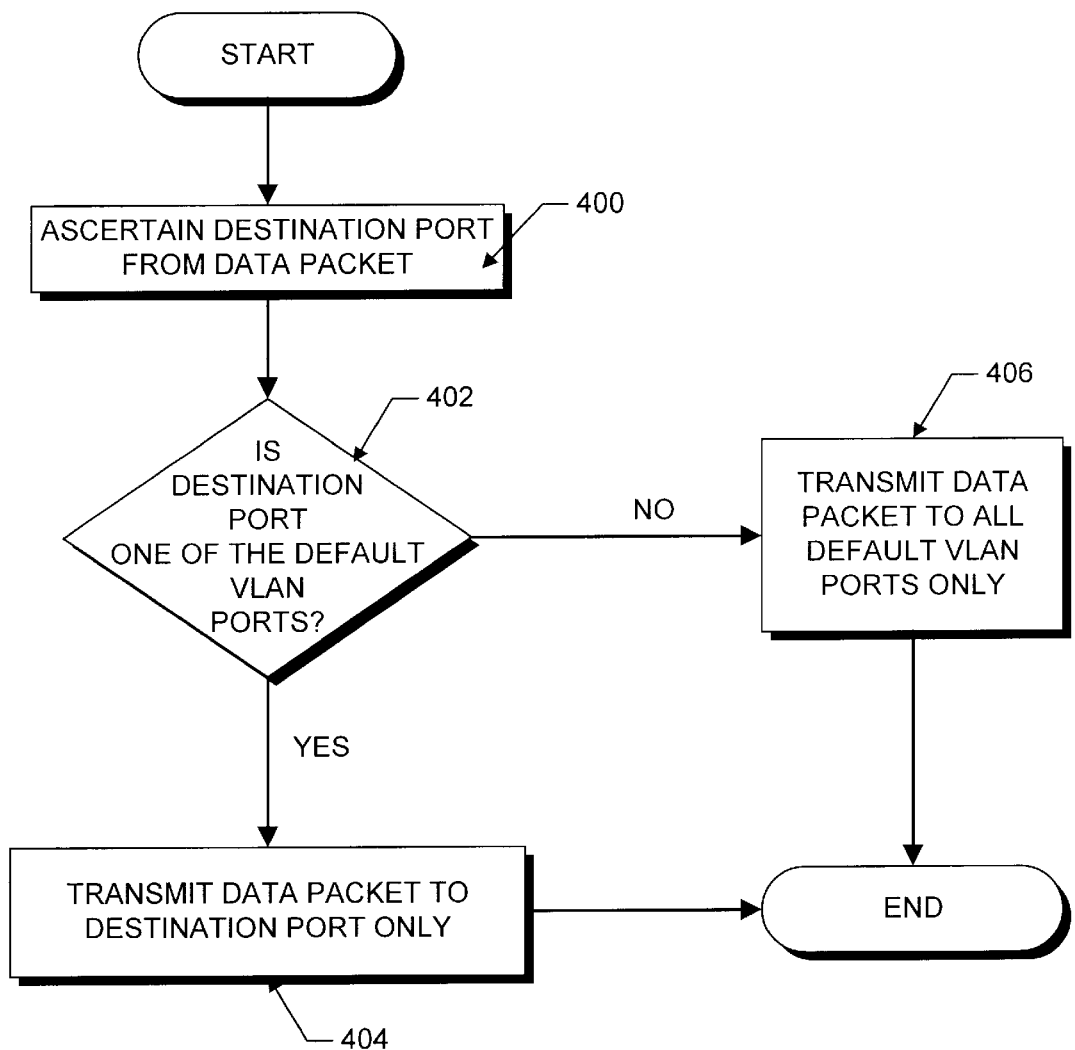
FIG. 4 is a flow chart that specifies the method used for preventing leakage from the default VLAN.

FIG. 4 shows a flow chart that specifies the method used for preventing leakage from the default VLAN. More particularly, the destination port address is ascertained from the header 28 of a data packet received on one of the default VLAN ports (step 400). At step 402, it is determined if the destination port is one of the default VLAN ports. If the destination port is one of the default VLAN ports, that data packet is transmitted to the destination port only (step 404). If the destination port is not one of the default VLAN ports, the data packet is transmitted to all of the default VLAN ports only (step 406). The data packet is transmitted to no other switch ports 18.

The default VLAN may be assigned a default VLAN tag that is assigned to a data packet when it enters through one of the default VLAN ports. The switch 16 then may be configured to prevent transmission of any data packet, having an associated default VLAN tag, through any of the other, non-default VLAN ports.

The invention may be implemented by means of a programmable logic chip within the one or more switches 16 used for the invention. The invention may also be implemented as firmware stored within those switches 16. Both implementations may be programmed by conventional methods.

In an alternative embodiment, the invention may be implemented as a computer program product for use with a computer system. Such implementation may include a series of computer instructions fixed either on a tangible medium, such as a computer readable media (e.g. diskette, CD-ROM, ROM, or fixed disk) or transmittable to a computer system, via a modem or other interface device, such as communications adapter connected to the network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the invention. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable media with accompanying printed or electronic documentation (e.g., shrink wrapped software), preloaded with a computer system (e.g., on system ROM or fixed disk), or distributed from a server or electronic bulletin board over a network (e.g., the Internet or World Wide Web).

The inventive default VLAN thus prevents leakage to other VLANs by transmitting received data packets to default VLAN ports only. Security thus is ensured for data packets transmitted to the default VLAN. Furthermore, the initial size and scope of the default VLAN is increased by enabling the enable switch 24, during manufacture, to interconnect each of the switches 16 connected to the hub 12.

While the invention has been shown and described above with respect to various preferred embodiments, it will apparent that the foregoing and other changes of the form and detail may be made therein by one skilled in the art without departing from the spirit and scope of the invention. These and other obvious modifications are intended to be covered by the following claims.

What is claimed is:

1. A port based default VLAN formed on one or more interconnected networking switches, each switch having one or more switch ports, all of the switch ports collectively being a plurality of switch ports, the default VLAN being defined by one or more of the plurality of switch ports, the one or more of the plurality of switch ports being default VLAN ports, at least one of the plurality of switch ports defining a second VLAN, the default VLAN comprising:

means for receiving a data packet through one of the default VLAN ports;

means for ascertaining a destination port from the data packet, the destination port being one of the plurality of switch ports;

means for determining whether the destination port is one of the default VLAN ports;

first means, responsive to the determining means, for transmitting the data packet to the destination port if the determining means determines that the destination port is one of the default VLAN ports; and second means, responsive to the determining means, for transmitting the data packet to each of the default VLAN ports if the determining means determines that the destination port is not one of the default VLAN ports, the at least one switch port defining the second VLAN being free from transmission, from the default VLAN, of the data packet.

2. The default VLAN as defined by claim 1 wherein the data packet includes a header and the ascertaining means ascertains the destination port from the packet header.

3. The default VLAN as defined by claim 1 further including means for tagging the data packet.

4. A method of limiting broadcast messages from a port based default VLAN, the default VLAN formed on one or more interconnected networking switches, each switch having one or more switch ports, all of the switch ports collectively being a plurality of switch ports, the default VLAN being defined by one or more of the plurality of switch ports, the one or more of the plurality of switch ports being default VLAN ports, at least one of the plurality of switch ports defining a second VLAN, the method comprising the steps of:

A. receiving a data packet through one of the default VLAN ports;
  B. ascertaining a destination port from the data packet, the destination port being one of the plurality of switch ports;
  C. determining whether the destination port is one of the default VLAN ports;
  D. transmitting the data packet to the destination port if the destination port is one of the default VLAN ports;
  E. transmitting the data packet to each of the default VLAN ports if the destination port is not one of the default VLAN ports; and
  F. preventing transmission, from the default VLAN, of the data packet to the at least one switch port defining the second VLAN.

5. The method as defined by claim 4 further including the step of:

G. tagging the data packet.

6. A computer program product for use with a switching device, the computer program product limiting broadcast messages from a port based default VLAN, the default VLAN formed on one or more interconnected networking switches, each switch having one or more switch ports, all of the switch ports collectively being a plurality of switch ports, the default VLAN being defined by one or more of the plurality of switch ports, the one or more of the plurality of switch ports being default VLAN ports, at least one of the plurality of switch ports defining a second VLAN, the computer program product comprising a computer usable medium having computer readable program code thereon, including:

program code for receiving a data packet through one of the default VLAN ports;
  program code for ascertaining a destination port from the data packet, the destination port being one of the plurality of switch ports;
  program code for determining whether the destination port is one of the default VLAN ports;
  program code for transmitting the data packet to the destination port if the program code for determining determines that the destination port is one of the default VLAN ports; and
  program code for transmitting the data packet to each of the default VLAN ports if the destination port is not one of the default VLAN ports,
  program code for preventing transmission, from the default VLAN, of the data packet to the at least one switch port defining the second VLAN.

7. The computer program product as defined by claim 6 further including program code for tagging the data packet.

8. A port based default VLAN formed on a hub having at least two networking switches connected thereto, each switch having one or more switch ports, the port based default VLAN comprising:

a bus in the hub;
  an enable switch for electrically connecting each of the VLAN ports to the bus;
  means for defining a subset of the one or more switch ports of each switch as default VLAN ports;
  means for receiving, at at least one of the default VLAN ports, a packet destined for a port that is not defined as one of the default VLAN ports, including means for broadcasting the received packet to each of the default VLAN ports in the subset of ports defined as default VLAN ports.

* * * * *